Patented June 21, 1949

2,473,960

UNITED STATES PATENT OFFICE 2,473,960

SILICATE-TITANATE PHOSPHORS

Ferdinand Anne Kröger, Eindhoven, Netherlands, assignor, by mesne assignments, to Hartford National Bank and Trust Company, Hartford, Conn., as trustee No Drawing. Application January 14, 1946, Serial No. 641,182. In the Netherlands November 16, 1942

Section 1, Public Law 690, August 8, 1946
Patent expires November 16, 1962

9 Claims. (Cl. 252—301.6)

This invention relates to a luminescent material and to a method of preparing such a material.

In a prior application for a patent (Dutch Patent application No. 107,011) not yet published it has already been proposed to make use of a luminescent material consisting of magnesium oxide, silicon dioxide and titanium oxide in an electric discharge tube, definite ratios being prescribed for these three oxides. This magnesium-silicate-titanate gives a blue luminescence under bombardment by electrons and appears to have a great efficiency in converting the energy of the impinging electrons into blue light.

The present invention concerns the use of luminescent materials by which the energy of impinging electrons or incident ultra-violet rays having a short wave length is also translated into blue light.

An electric discharge tube according to the invention contains a luminescent material built up of silicon dioxide, titanium dioxide and one or more of the oxides of calcium, strontium, cadmium, sodium or lithium, if required together with magnesium oxide.

The above-named materials may be conceived as titanium-activated silicates in the form of silicate-titanates. For these materials may be written the general formula $$x(MO) : y(SiO_2) : z(TiO_2)$$

where M represents one or more of the metals calcium, strontium, cadmium, sodium, lithium, or magnesium.

The materials to be used in discharge tubes according to the invention may consist of greatly different combinations of the various oxides, but at any rate silicon dioxide, titanium dioxide and one of the oxides of the further elements referred to should be present. However, if the material contains magnesium oxide, the luminescent material always contains in addition to silicon dioxide and titanium dioxide an oxide of one of the other metals.

The ratios of the coefficients $x$, $y$ and $z$ are preferably so chosen as to have a ratio $x:(y+z)$ between 2:1 and 1:5. In fact, the materials satisfying these ratios yield the greatest efficiency in converting the incident energy into blue light.

As examples of electric discharge tubes according to the invention we may mention Braun tubes on the one hand and mercury-vapour discharge tubes on the other hand. In the tubes of the first-mentioned group the luminescence is produced by electrons and in tubes of the second group by ultra-violet radiation.

The materials used in discharge tubes according to the invention might be conceived as silicates of various metals, the silicon in the lattice being partly replaced by titanium. The quantity of titanium thus available in the material may be much larger than is usually the case with activators of luminescent materials. Thus, for instance, a material consisting of a calcium oxide, silicon dioxide and titanium dioxide even luminesces when the ratio of titanium dioxide and silicon dioxide in gramme-molecule corresponds to 60:40 and the number of gramme-molecule calcium oxide corresponds to the sum of the number of gramme-molecule silicon dioxide and titanium dioxide. However, the maximum luminescence is found with ratios of the titanium dioxide and the silicon dioxide between 1:100 and 1:10.

Examples of silicate-titanates containing more than one metal beyond silicon and titanium are calcium - magnesium - silicate - titanate and calcium-sodium-silicate-titanate.

Of sodium and lithium both the meta-silicates and the di-silicates are luminescent if a part of the silicon in the lattice be replaced by titanium. Thus, for instance, sodium-meta-silicate luminesces up to a content of titanium dioxide where the ratio in gramme-molecule of the last-mentioned dioxide to silicon dioxide corresponds to 35:65. Sodium di-silicate luminesces up to a content of titanium dioxide where this ratio is about 10:90.

The materials used in electric discharge tubes according to the invention have the advantage over those already known that the spectral distribution of the emission can be varied at will within definite limits, which permits the choice of a material which is most convenient for a definite purpose. Thus, for instance, cadmium-meta-silicate and sodium-silicate together with titanium luminesces white-blue, sodium-meta-silicate and strontium-meta-silicate luminescing intense blue, the radiation causing the luminescence consisting of electrons or ultra-violet rays having wave lengths smaller than 3000 Å. Moreover, all of these materials have the advantage of the conversion of the incident energy taking place with a high efficiency.

A material to be used in a tube according to the invention may be mixed with luminescent material whose emission lies in another part of the spectrum and which emits red light, for instance.

In a process also forming part of the invention a mixture of one or more of the oxides of calcium, strontium, cadmium, sodium or lithium together with silicon dioxide and titanium dioxide, if required with magnesium oxide, or a mixture of compounds from which these oxides may arise by heating, is heated in a non-reducing medium. The heating operation preferably takes place in an oxidising atmosphere such as, for instance, air or oxygen. The temperature at which the heating operation takes place may be chosen above or below the melting point of the luminescent material. It is to be noted that care should be taken that in those cases, where the materials may appear in the form of glass, for instance with sodium silicates, the final material should not contain glass, since vitreous materials are detrimental to the luminescence. Consequently, in preparing the material care must be taken to effect the heating operation in such manner as to remain below the temperature at which glass is formed. For this reason the temperature should not exceed that of the lowest eutectic of the system in question. If, notwithstanding that, glass should be produced during this treatment it must be eliminated by heating for a considerable time to a temperature below the above-mentioned eutectic.

As compounds capable of being easily decomposed we may, for instance, mention calcium acetate for calcium, and sodium carbonate or sodium acetate for sodium.

For the addition of the silicon dioxide use is preferably made of ethyl silicate ester dissolved in alcohol.

The preparation of the luminescent materials will be more fully explained by giving a few examples of a method according to the invention.

Example I

An aqueous solution containing 23.5 gms. of sodium carbonate is mixed with 210 cu. cms. of a solution of ethyl silicate ester in alcohol (content 124 gms. of silicon dioxide per litre) and 6 cu. cms. of a purified acetic titanium dioxide solution with a content of 65.3 gms. of titanium dioxide per litre. After addition of ammonia the reaction mixture obtained is evaporated to dryness and heated for several hours at about 700° C. in the air or in an oxygen atmosphere. Upon irradiation with cathode rays and ultra-violet rays having a wave length of less than 3000 Å. the resultant white powder luminesces white-blue.

Example II

An aqueous solution of 77 gms. of calcium acetate is mixed with 190 cu. cms. of a solution of ethyl silicate ester in alcohol (content 124 gms. of silicon dioxide per litre) and 60 cu. cms. of a pure acetic solution of titanium dioxide containing 65.3 gms. of titanium dioxide per litre. After addition of ammonia the reaction mixture obtained is evaporated to dryness and preheated for some time at 500° C. in the air. After that it is heated for several hours at a temperature of 1225° C. in the air or in an oxygen atmosphere.

The material obtained exhibits a light rose colour and gives a white-blue luminescence upon irradiation with cathode rays or ultra-violet rays having a short wave length (a wave length of less than 2500 Å.).

Example III

An aqueous solution of 70 gms. of calcium acetate and 86 gms. of magnesium acetate is mixed with 60 cu. cms. of an acetic solution of titanium dioxide containing 65.3 gms. of titanium dioxide per litre and 190 cu. cms. of a solution of ethyl silicate ester in alcohol (content 124 gms. of silicon dioxide per litre). After the addition of ammonia the reaction mixture obtained is evaporated to dryness on a water bath and the dry material is preheated in the air at about 600° C., followed by heating for several hours at 1250° C. in an oxygen atmosphere. The obtained white material luminesces dark blue upon irradiation with cathode rays or ultra-violet rays having a wavelength of less than 2500 Å.

What I claim is:

1. A crystalline luminescent material consisting of titanium activated silicates in the form of silicate-titanates and consisting of the fired reaction product of silicon dioxide, titanium dioxide and an oxide of metal of the group consisting of calcium, strontium, cadmium, sodium, and lithium, the constituent oxides of said silicate-titanates being in the ratios in gram molecules $x:(y+z)$ between about 2:1 to about 1:5 and $z:y$ between about 1.5:1 to about 1:100 wherein $x$ represents the said metal oxide component, $y$ represents the silicon dioxide component and $z$ represents the titanium dioxide component.

2. A crystalline luminescent material consisting of titanium activated silicates in the form of silicate-titanates and consisting of the fired reaction product of silicon dioxide, titanium dioxide, magnesium oxide, and an oxide of a metal of the group consisting of calcium, strontium, cadmium, sodium, and lithium, the constituent oxides of said silicate titanates being in the ratios in gram molecules $x:(y+z)$ between about 2:1 to about 1:5 and $z:y$ between about 1.5:1 to about 1:100 wherein $x$ represents the magnesium oxide component and the said metal oxide component, $y$ represents the silicon dioxide component and $z$ represents the titanium dioxide component.

3. A crystalline luminescent material consisting of titanium activated silicates in the form of silicate-titanates and consisting of the fired reaction product of silicon dioxide, titanium dioxide, and an oxide of a metal of the group consisting of calcium, strontium, cadmium, sodium, and lithium, the ratio in gram-molecules of the total other oxides to said silicon dioxide and titanium dioxide being between about 2:1 to about 1:5 and the ratio in gram molecules of said titanium dioxide to said silicon dioxide being between about 1:10 to about 1:100.

4. The method of preparing a luminescent material comprising the steps of forming a mixture of oxides comprising silicon dioxide, titanium dioxide, and an oxide of a metal of the group consisting of calcium, strontium, cadmium, sodium, and lithium, the components of said mixture being in the ratios $x:(y+z)$ between about 2:1 to about 1:5 and $z:y$ between about 1.5:1 to about 1:100 wherein $x$ represents the said metal oxide component, $y$ represents the silicon dioxide component and $z$ represents the titanium dioxide component, heating said mixture to a temperature sufficient to produce a luminescent material and below the temperature at which glass would be formed for several hours in an oxidizing atmosphere, and cooling said mixture to produce a crystalline luminescent material.

5. The method of preparing a crystalline luminescent material consisting of the steps of forming a mixture of oxides comprising silicon dioxide, titanium dioxide, and an oxide of a metal of the group consisting of calcium, strontium, cadmium, sodium, and lithium, the components of said mixture being in the ratio $x:(y+z)$ between about 2:1 to about 1:5 and $z:y$ between about 1.5:1 to about 1:100 wherein $x$ represents the said metal oxide component, $y$ represents the silicon dioxide component and $z$ represents the titanium dioxide component, heating said mixture to a temperature sufficient to produce a luminescent material and slightly below the lowest eutectic temperature of the said mixture, and cooling said mixture to about room temperatures to produce a crystalline luminescent material.

6. A crystalline luminescent material consisting essentially of titanium activated silicates in the form of silicate-titanates and consisting of the fired reaction product of silicon dioxide, titanium dioxide, magnesium oxide and an oxide of a metal of the group consisting of calcium, strontium, cadmium, sodium and lithium, the constituent oxides of said silicate-titanates being in the ratios in gram molecules $x:(y+z)$ between about 2:1 to about 1:5 and $z:y$ between about 1:10 to about 1:100 wherein $x$ represents the magnesium oxide component and the said metal oxide component, $y$ represents the silicon dioxide component and $z$ represents the titanium dioxide component.

7. A crystalline luminescent material consisting essentially of sodium silicate-titanate and consisting of the fired reaction product of approximately 13.7 grams of sodium oxide, approximately 26 grams of silicon dioxide and approximately 3.92 grams of titanium dioxide.

8. A crystalline luminescent material consisting essentially of calcium silicate-titanate consisting of the fired reaction product of approximately 27.3 grams of calcium oxide, approximately 23.6 grams of silicon dioxide and approximately 3.92 grams of titanium dioxide.

9. A crystalline luminescent material consisting essentially of calcium-magnesium silicate-titanate consisting of the fired reaction product of approximately 24.8 grams of calcium oxide, approximately 16.2 grams of magnesium oxide, approximately 23.6 grams of silicon dioxide, and approximately 3.92 grams of titanium dioxide.

FERDINAND ANNE KRÖGER.

REFERENCES CITED

The following references are of record in the file of this patent:

UNITED STATES PATENTS

| Number | Name | Date |
|---|---|---|
| 2,171,145 | Leverenz | Aug. 29, 1939 |
| 2,244,558 | Krautz | June 3, 1941 |
| 2,257,667 | Aschermann | Sept. 30, 1941 |
| 2,269,819 | Isenberg | Jan. 13, 1942 |
| 2,298,947 | Leverenz | Oct. 13, 1942 |
| 2,379,057 | Anderson | June 26, 1945 |
| 2,415,129 | Froelich | Feb. 4, 1947 |

Certificate of Correction

June 21, 1949.

Patent No. 2,473,960.

FERDINAND ANNE KRÖGER

It is hereby certified that errors appear in the printed specification of the above numbered patent requiring correction as follows:

Column 4, line 65, claim 4, and column 5, line 7, claim 5, for the word "comprising" read *consisting of*; column 5, line 6, claim 5, for "consisting of" read *comprising*; column 6, line 8, claim 7, for "3.92 grams" read *.392 gram*;

and that the said Letters Patent should be read with these corrections therein that the same may conform to the record of the case in the Patent Office.

Signed and sealed this 15th day of November, A. D. 1949.

[SEAL]

THOMAS F. MURPHY,
*Assistant Commissioner of Patents.*